(12) United States Patent
Muto et al.

(10) Patent No.: US 6,856,890 B2
(45) Date of Patent: Feb. 15, 2005

(54) INTAKE AIR AMOUNT ESTIMATION APPARATUS AND METHOD FOR INTERNAL COMBUSTION ENGINE

(75) Inventors: Harufumi Muto, Nishikamo-gun (JP); Daisuke Kobayashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/728,964

(22) Filed: Dec. 8, 2003

(65) Prior Publication Data

US 2004/0117104 A1 Jun. 17, 2004

(30) Foreign Application Priority Data

Dec. 17, 2002 (JP) ........................................ 2002-365584

(51) Int. Cl.[7] .............................................. F02D 45/00
(52) U.S. Cl. ....................... 701/108; 73/117.3; 123/347; 123/90.15
(58) Field of Search ................................ 701/108, 109, 701/102, 101, 115; 73/117.3, 118.2; 123/90.15, 90.17, 347, 348

(56) References Cited

U.S. PATENT DOCUMENTS 5,590,632 A * 1/1997 Kato et al. ................ 73/117.3
6,553,964 B2 * 4/2003 Arai et al. ................. 701/115
2004/0065303 A1 * 4/2004 Russell et al. ............. 701/108

FOREIGN PATENT DOCUMENTS

| JP | A 2001-41095 | 2/2001 |
| JP | A 2002-147279 | 5/2002 |
| JP | A 2002-180877 | 6/2002 |

* cited by examiner

Primary Examiner—Hieu T. Vo
(74) Attorney, Agent, or Firm—Oliff & Berridge, PLC

(57) ABSTRACT

In an internal combustion engine wherein a valve timing can be changed in at least two stages and wherein an exhaust gas recirculation passage provided with a control valve is connected to an intake pipe downstream of a throttle valve, there is provided an intake air amount estimation apparatus that estimates, on the basis of an intake pipe pressure, an amount of intake air drawn via the throttle valve. An amount of recirculated exhaust gas flowing past the control valve having a specific opening degree based on an intake pipe pressure in the case of the first valve timing is calculated as an intake exhaust gas amount. On the assumption that this intake exhaust gas amount remains unchanged irrespective of a valve timing, an intake air amount in the case of the second valve timing is calculated.

16 Claims, 5 Drawing Sheets

INTAKE AIR AMOUNT ESTIMATION APPARATUS AND METHOD FOR INTERNAL COMBUSTION ENGINE

INCORPORATION BY REFERENCE

The disclosure of Japanese Patent Application No. 2002-365584 filed on Dec. 17, 2002 including the specification, drawings, and abstract is incorporated herein by reference in its entirety.

BACKGROUND OF THE INVENTION

1. Field of the Invention

The invention relates to an intake air amount estimation apparatus/method for an internal combustion engine.

2. Description of the Related Arts

An amount of intake air supplied into cylinders must be grasped in order to control an air-fuel ratio. It has been known that the amount of intake air changes in accordance with the pressure in an intake pipe disposed downstream of a throttle valve. A related art for approximating and calculating an intake air amount by means of a linear equation of an intake pipe pressure is disclosed. In related arts disclosed in Japanese Patent Application Laid-Open No. 2002-180877, the fact that an intake air amount decreases because of backflow of exhaust gas in cylinders into an intake pipe during a suction stroke if valve overlap is caused by a variable valve timing mechanism is taken into account in approximation based on a linear equation of an intake pipe pressure. In addition, the fact that a decrease in intake air amount is reduced due to the unlikelihood of backflow of exhaust gas if the intake pipe pressure is equal to or higher than a predetermined pressure is also taken into account.

That is, an intake air amount is calculated on the basis of an intake pipe pressure using a linear equation that differs depending on whether or not valve overlap has been caused. If valve overlap has been caused, an intake air amount is calculated using two continuous linear equations that are replaced with each other when the intake pipe pressure reaches a predetermined value.

SUMMARY OF THE INVENTION

According to the related art mentioned above, if only fresh air flows into an intake pipe via a throttle valve, an intake air amount can be calculated on the basis of an intake pipe pressure in consideration of the presence or absence of valve overlap. In general, however, exhaust gas flowing from an engine exhaust system via a control valve disposed in an exhaust gas recirculation passage flows also into the intake pipe. In a case like this, although an amount of intake gas (fresh air and recirculated exhaust gas) flowing into cylinders can be calculated on the basis of an intake pipe pressure according to the aforementioned related art, an amount of intake air flowing into the cylinders as an amount of intake air required for realization of a desired air-fuel ratio, namely, an intake fresh air amount cannot be calculated.

As one aspect of the invention, there is provided a first intake air amount estimation apparatus which is designed for an internal combustion engine wherein a valve timing can be changed in at least two stages between a first valve timing and a second valve timing and wherein an exhaust gas recirculation passage provided with a control valve is connected to an intake pipe downstream of a throttle valve, and which can estimate an intake air amount on the basis of an intake pipe pressure. This intake air amount estimation apparatus comprises a first relational expression setter, a second relational expression setter, a first calculator, a second calculator, and a third calculator. The first relational expression setter sets a first relational expression between an intake pipe pressure and an amount of intake gas flowing into cylinders in the case of the first valve timing. The second relational expression setter sets a second relational expression between the intake pipe pressure and the intake gas amount in the case of the second valve timing. The first calculator calculates, in the case of the first valve timing, an amount of recirculated exhaust gas flowing past the control valve which is based on an intake pipe pressure at the time when the control valve is at a specific opening degree, as an amount of intake exhaust gas flowing into the cylinders during steady operation of the engine. The second calculator calculates, on the basis of the intake exhaust gas amount and by means of the first relational expression, an amount of intake air that is drawn via the throttle valve at the time when the control valve is at the specific opening degree in the case of the first valve timing. The third calculator calculates, on the basis of the intake exhaust gas amount and by means of the second relational expression, an intake air amount at the time when the control valve is at the specific opening degree in the case of the second valve timing, on the assumption that the intake exhaust gas amount for the specific opening degree based on the intake pipe pressure remains unchanged irrespective of a valve timing.

According to this intake air amount estimation apparatus, an intake air amount at the time when the control valve is at a specific opening degree can be estimated on the basis of an intake pipe pressure in each of the case of the first valve timing and the case of the second valve timing.

As another aspect of the invention, there is provided a second intake air amount estimation apparatus. This intake air amount estimation apparatus comprises a relational expression setter, a first calculator, and a second calculator. The relational expression setter sets, on the assumption that an amount of recirculated exhaust gas flowing past a control valve as an amount based on an intake pipe pressure is equal to an amount of intake exhaust gas flowing into cylinders during steady operation of an internal combustion engine wherein a valve timing is variable and wherein an exhaust gas recirculation passage provided with the control valve is connected to an intake pipe downstream of a throttle valve, a relational expression between an intake pipe pressure Pm and an amount KL of intake air drawn via the throttle valve during steady operation of the engine as $KL=e(Pm-g)+r$, using coefficients "e" and "r" that are determined in advance in accordance with an engine speed, the valve timing, and an opening degree of the control valve and a coefficient "g" that is determined in advance in accordance with the engine speed alone or its combination with the valve timing and/or the opening degree of the control valve. The first calculator calculates, as an amount of intake exhaust gas flowing into the cylinders during steady operation of the engine, an amount of recirculated exhaust gas flowing past the control valve at the time when the control valve is at a specific opening degree based on an intake pipe pressure. The second calculator calculates, on the basis of the intake exhaust gas amount and by means of the relational expression, the intake air amount at the time when the control valve is at the specific opening degree.

According to this intake air amount estimation apparatus, an intake air amount for an arbitrary valve timing and an arbitrary opening degree of the control valve can be calculated on the basis of an intake pipe pressure.

BRIEF DESCRIPTION OF THE DRAWINGS

The above-mentioned objects, features, advantages, technical and industrial significance of this invention will be better understood by reading the following detailed description of the exemplary embodiment of the invention, when considered in connection with the accompanying drawings, in which.

DETAILED DESCRIPTION OF PREFERRED EMBODIMENT

In the following description, the invention will be described in more detail in terms of an exemplary embodiment.

Figure 1:
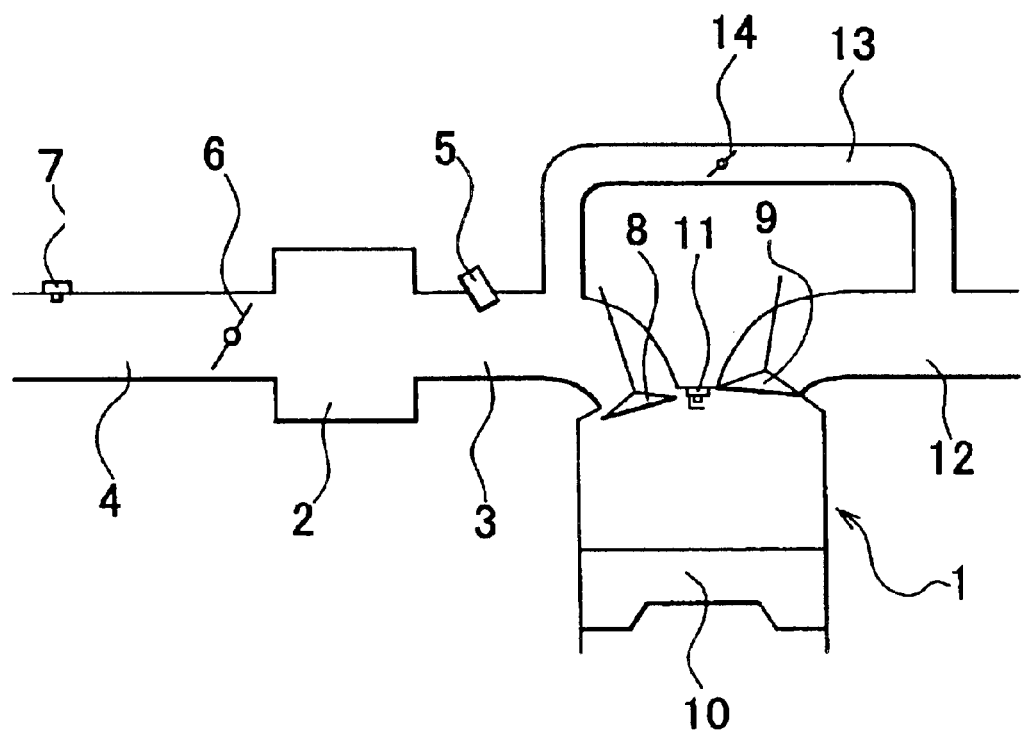
FIG. 1 is a schematic view of an internal combustion engine mounted with an intake air amount estimation apparatus in accordance with the invention.

FIG. 1 is a schematic view of an internal combustion engine mounted with an intake air amount estimation apparatus in accordance with the invention. Referring to FIG. 1, a reference numeral 1 denotes an engine body, and a reference numeral 2 denotes a surge tank that is common to cylinders of the engine. A reference numeral 3 denotes each of intake branch pipes for establishing communication between the surge tank 2 and a corresponding one of the cylinders, and a reference numeral 4 denotes an intake passage upstream of the surge tank 2. A fuel injection valve 5 is disposed in each of the intake branch pipes 3. A throttle valve 6 is disposed immediately upstream of the surge tank 2 in the intake passage 4. The throttle valve 6 is not linked with an accelerator pedal. A drive unit such as a stepper motor or the like can freely set an opening degree of the throttle valve 6. However, this construction of the throttle valve 6 does not limit the invention. That is, the throttle valve 6 may be mechanically linked with the accelerator pedal. A reference numeral 7 denotes an air flow meter that detects a flow rate of intake air upstream of the throttle valve 6 in the intake passage 4. In the engine body 1, reference numerals 8, 9, 10, and 11 denote an intake valve, an exhaust valve, a piston, and an ignition plug respectively. A variable valve timing mechanism can change at least one of a timing for opening the intake valve 8 and a timing for closing the exhaust valve 9, whereby an optimal valve timing can be realized for each engine operation state that is determined by an engine speed, an engine load, and the like.

A reference numeral 12 denotes an engine exhaust system, and a reference numeral 13 denotes an exhaust gas recirculation passage that establishes communication between a region downstream of a meeting portion of exhaust gas flowing from the cylinders in the engine exhaust system 12 and the intake branch pipes 3 of the cylinders. By supplying exhaust gas into the cylinders via the exhaust gas recirculation passage 13, it becomes possible to lower a combustion temperature and reduce a generation amount of NOx. As the amount of exhaust gas to be recirculated increases, the generation amount of NOx can be reduced. On the other hand, a substantial drop in engine output is caused. A control valve 14, which controls a recirculation amount of exhaust gas, is disposed in the exhaust gas recirculation passage 13. An opening degree of the control valve 14 is set for each engine operation state that is determined by an engine speed, an engine load, and the like. An engine intake system downstream of the throttle valve 6 and the control valve 14 (i.e., the surge tank 2, part of the exhaust gas recirculation passage 13, and the intake branch pipes 3) is referred to as an intake pipe. A volume of the intake pipe is referred to as an intake pipe volume.

In order to equalize a combustion air-fuel ratio of the internal combustion engine 1 with a desired air-fuel ratio such as a stoichiometric air-fuel ratio or the like, it is necessary to precisely estimate an amount of intake air flowing into the cylinders during all periods including a period in which the engine is in transition. When the engine is in steady operation, the air flow meter 7 can measure an intake air amount relatively precisely. However, when the engine is in transition, the output of the air flow meter 7 does not immediately respond to an abrupt change in intake air amount, and therefore, precise measurement of an intake air amount is impossible.

To make it possible to precisely grasp an intake air amount even when the engine is in transition, the intake air amount estimation apparatus of the invention is designed to estimate an intake air amount by modeling the engine intake system.

First of all, the throttle valve 6 is modeled, whereby a current amount $mt_{(i)}$(g/sec) of air flowing past the throttle valve is expressed by an equation (1) shown below, using the law of conservation of energy, the law of conservation of momentum, and a state equation at the time when intake air flows past the through valve 6. For all the equations shown below including the equation (1), if a variable such as an amount of air flowing past the throttle valve or the like is accompanied by a suffix$_{(i)}$ or a suffix$_{(i-1)}$, it represents a current value or a last value, respectively.

$$mt_{(i)} = \mu 1_{(i)} \cdot At_{(i)} \cdot \frac{Pa}{\sqrt{R \cdot Ta}} \cdot \Phi \ (Pm_{(i)}/Pa) \quad (1)$$

Figure 2:
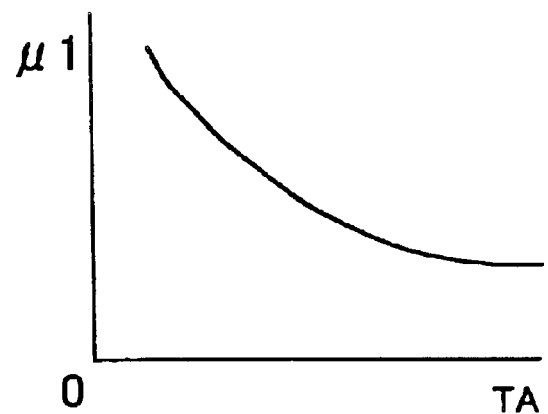
FIG. 2 is a map showing a relationship between opening degrees TA of a throttle valve and flow rate coefficients $\mu$.
Figure 3:
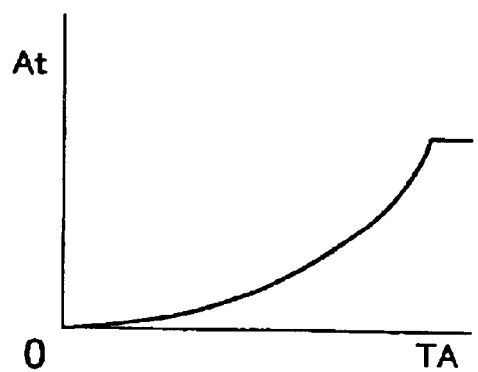
FIG. 3 is a map showing a relationship between opening degrees TA of the throttle valve and opening areas A of the throttle valve.
Figure 4:
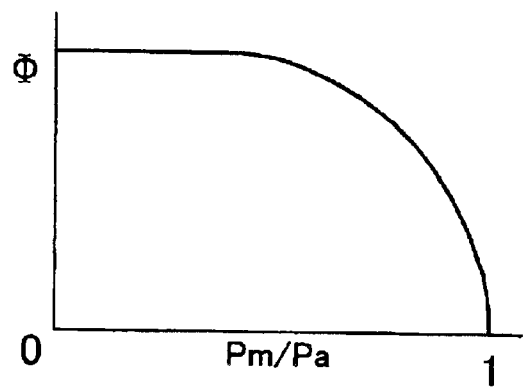
FIG. 4 is a map showing a relationship between ratios of pressures Pm of an intake pipe to atmospheric pressures Pa and functions $\Phi$.

It is to be noted herein that $\mu 1_{(i)}$ represents a flow rate coefficient and that $At_{(i)}$ represents an opening area (m³) of the throttle valve 6. As a matter of course, if the engine intake system is provided with an idling speed control valve (an ISC valve), an opening area of the ISC valve is added to the opening area $At_{(i)}$. Each of the flow rate coefficient and the opening area of the throttle valve is a function of an opening degree $TA_{(i)}$ (degrees) of the throttle valve. Each of FIGS. 2 and 3 shows a map for opening degrees TA of the throttle valve. It is to be noted that R represents a gas constant, that Ta represents an intake air temperature (K) upstream of the throttle valve, that Pa represents a pressure (kPa) upstream of the throttle valve in the intake passage, and that $Pm_{(i)}$ represents a pressure (kPa) in the intake pipe downstream of the throttle valve. A function $\Phi \times (Pm_{(i)}/Pa)$ is expressed by equations (2a) and (2b) shown below, using a ratio κ of specific heat. FIG. 4 shows a map for Pm/Pa.

$$\text{If } \frac{Pm_{(i)}}{Pa} \leq \frac{1}{\kappa+1}, \Phi(Pm_{(i)}/Pa) = \sqrt{\frac{\kappa}{2 \cdot (\kappa+1)}} \qquad (2a)$$

$$\text{If } \frac{Pm_{(i)}}{Pa} > \frac{1}{\kappa+1},$$

$$\Phi(Pm_{(i)}/Pa) = \sqrt{\left\{\frac{\kappa-1}{2 \cdot \kappa} \cdot \left(1 - \frac{Pm_{(i)}}{Pa}\right) + \frac{Pm_{(i)}}{Pa}\right\} \cdot \left(1 - \frac{Pm_{(i)}}{Pa}\right)} \qquad (2b)$$

In the internal combustion engine shown in FIG. 1, not only air flowing past the throttle valve 6 but also exhaust gas flowing from the engine exhaust system 12 via the control valve 14 in the exhaust gas recirculation passage 13 flows into the intake pipe. Thereby the control valve 14 is modeled next. As is the case with the amount of air flowing past the throttle valve, a current amount $megr_{(i)}$ (g/sec) of exhaust gas flowing past the control valve is expressed by an equation (3) shown below, using the law of conservation of energy, the law of conservation of momentum, and a state equation at the time when exhaust gas flows past the control valve 14.

$$megr_{(i)} = \mu 2_{(i)} \cdot Ae_{(i)} \cdot \frac{Pe}{\sqrt{R \cdot Te}} \cdot \Phi(Pm_{(i)}/Pe) \qquad (3)$$

It is to be noted herein that $\mu 2_{(i)}$ represents a flow rate coefficient and that $Ae_{(i)}$ represents an opening area (m³) of the control valve 14. Each of the flow rate coefficient and the opening area of the control valve is a function of an opening degree $EA_{(i)}$ (degrees). As is the case with FIGS. 2 and 3, each of the flow rate coefficient and the opening area of the control valve is made available as a map for an opening degree EA of the control valve. It is to be noted that R represents a gas constant, that Te represents a temperature (K) of exhaust gas upstream of the control valve, that Pe represents a pressure (kPa) of exhaust gas upstream of the control valve, and that Pm(i) represents a pressure (kPa) downstream of the control valve in the intake pipe. A function $\Phi \times (Pm_{(i)}/Pe)$ is obtained by substituting an exhaust gas pressure Pe for the pressure Pa in the intake passage in the equations (2a) and (2b).

Figure 5:
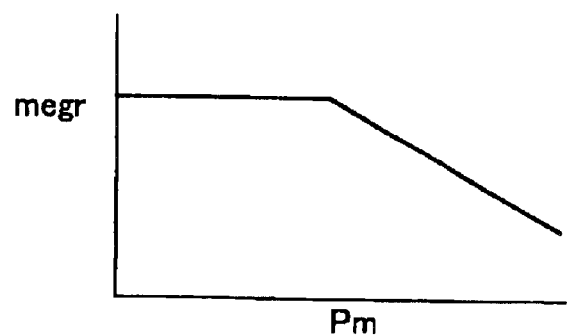
FIG. 5 is a graph showing a relationship between pressures Pm of the intake pipe and amounts megr of exhaust gas flowing past a control valve.

If a function B of the opening degree EA of the control valve is substituted for a portion other than the function $\Phi \times (Pm_{(i)}/Pe)$ on the right side of the equation (3), an equation (4) shown below can be obtained. That is, the amount megr of exhaust gas flowing past the control valve may change only by the function $\Phi \times (Pm_{(i)}/Pe)$ for an arbitrary opening of the control valve. In a range corresponding to a small amount of intake air, the exhaust gas pressure Pe is substantially equal to the atmospheric pressure Pa. In a range corresponding to a large amount of intake air, the exhaust gas pressure Pe rises as the intake air amount increases. The intake air amount is proportional to the pressure Pm in the intake pipe. Therefore, if an opening degree of the control valve is determined, the amount megr of exhaust gas flowing past the control valve can be approximated through two continuous linear equations of the pressure Pm in the intake pipe as shown in FIG. 5, for each engine speed.

$$megr_{(i)} \approx B \cdot \Phi(Pm_{(i)}/Pe) \qquad (4)$$

Figure 6:
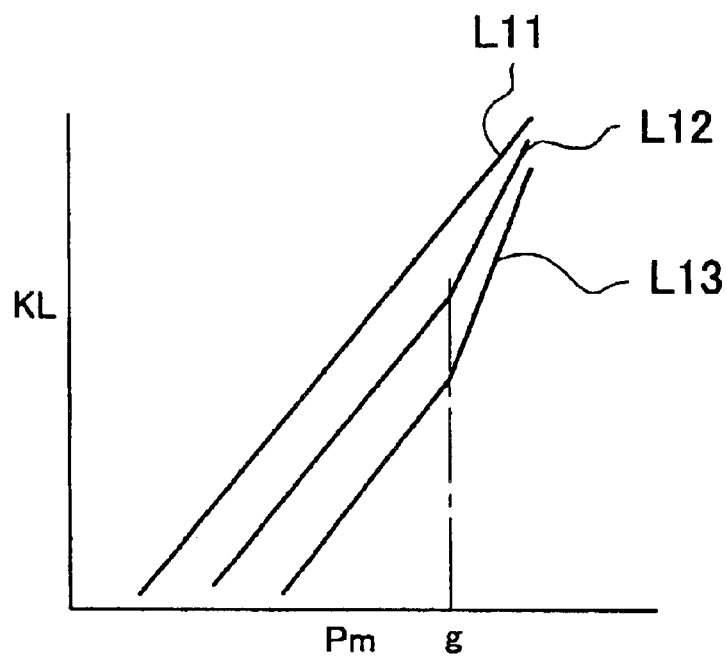
FIG. 6 shows a relational expression between a pressure Pm of the intake pipe and an intake air amount KL for each opening degree of the control valve in the case of a valve overlap amount of 0.

Then, the intake valve is modeled. An amount mc (g/sec) of intake gas supplied from the intake pipe into the cylinders is approximated through a linear equation of the pressure Pm in the intake pipe. FIG. 6 shows a case where the valve overlap amount is equal to zero or small at a valve timing corresponding to an engine operation state and where exhaust gas does not flow backwards from the interiors of the cylinders into the intake pipe at the time of valve overlap. Referring to FIG. 6, a solid line L11 indicates a time when exhaust gas does not flow into the intake pipe via the control valve 14, namely, a time when the interior of the intake pipe is filled with air with the control valve assuming an opening degree of 0. On the other hand, a solid line L12 indicates a time when exhaust gas flows into the intake pipe via the control valve 14 with the control valve assuming an opening degree EA1. When the engine is in steady operation, the amount of exhaust gas flowing past the control valve 14 is equal to the amount of intake exhaust gas flowing into the cylinders from the intake pipe. That is, when the engine is in steady operation, the amount of intake exhaust gas linearly changes in accordance with an opening degree of the control valve due to a pressure in the intake pipe, substantially as shown in FIG. 5. If the amount of intake exhaust gas is thus taken into account, an amount KL of intake air during steady operation of the engine can be set in advance for a pressure Pm in the intake pipe at the time when the control valve assumes the opening degree EA1, as indicated by the solid line L12.

A solid line L13 in FIG. 6 indicates an amount KL of intake air during steady operation of the engine for a pressure Pm in the intake pipe at the time when the control valve assumes an opening degree EA2 that is larger than the opening degree EA1. The solid line L13 is set substantially in the same manner as described above in consideration of the fact that the amount of intake exhaust gas flowing into the cylinders increases as a whole as the pressure Pm in the intake pipe. Although omitted in FIG. 6, a relational expression between the pressure Pm in the intake pipe and the amount KL of intake air is set for each opening degree of the control valve 14. For practical purposes, the relational expression is stored in the intake air amount estimation apparatus as an equation (5) shown below.

$$KL = e(Pm - g) + r \qquad (5)$$

For an equal pressure in the intake pipe, the intake air amount KL during steady operation of the engine changes in accordance with an engine speed. In the equation (5), therefore, if no regard is paid to valve timings, it is appropriate that a first coefficient "e", a second coefficient "g", and a third coefficient "r" be set according to a two-dimensional map of engine speeds and opening degrees of the control valve. In addition, in the case where the pressure Pm in the intake pipe and the amount KL of intake air are set as a line graph shown in FIG. 6 as in the case of the present embodiment, the first coefficient "e" is changed to a different value when the pressure Pm in the intake pipe becomes equal to the second coefficient "g". The relational expressions shown in FIG. 6 are set by a relational expression setter (not shown) constituting the intake air amount estimation apparatus of the invention.

A relational expression between the pressure Pm in the intake pipe and the amount KL of intake air at the time when the control valve assumes an opening degree 0 is stored in the intake air amount estimation apparatus as an equation (6) shown below.

$$KL = a(Pm-b) + c \quad (6)$$

If no regard is paid to valve timings, it is appropriate that a fourth coefficient "a", a fifth coefficient "b", and a sixth coefficient "c" be set according to a one-dimensional of engine speeds.

If the valve overlap amount or the like increases due to a valve timing corresponding to an engine operation state, exhaust gas in the cylinders flows backwards into the intake pipe, so that the amount of intake air decreases correspondingly. In general, the amount of exhaust gas flowing backwards increases as the valve overlap amount increases. If the pressure Pm in the intake pipe rises above a predetermined value "b", exhaust gas gradually becomes unlikely to flow backwards. In this case, therefore, the decrease in the amount of intake air gradually decreases. In consideration of this phenomenon, the pressure Pm in the intake pipe and the amount KL of intake air at the time when the valve timing is equal to a predetermined value VVT1 can be set as indicated by a solid line L21 in FIG. 7.

Figure 7:
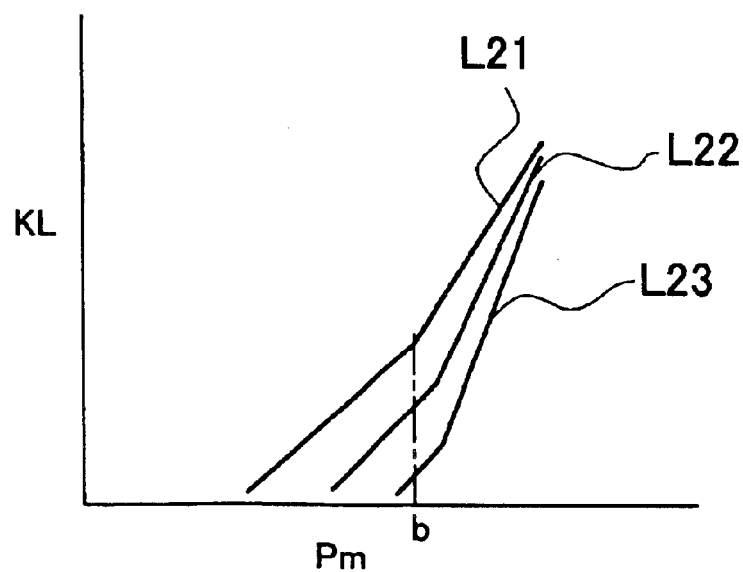
FIG. 7 shows a relational expression between a pressure Pm of the intake pipe and an intake air amount KL for each opening degree of the control valve in the case of a valve timing of a predetermined value.

In the case where the valve timing is equal to VVT1, if exhaust gas flows into the intake pipe via the control valve 14 in response to the opening thereof, the amount KL of intake air correspondingly decreases substantially in the same manner as described above. A relational expression between the pressure Pm in the intake pipe and the amount KL of intake air at the time when the control valve assumes the opening degree EA1 and a relational expression between the pressure Pm in the intake pipe and the amount KL of intake air at the time when the control valve assumes the opening degree EA2 can be set as indicated by solid lines L22 and L23 in FIG. 7, respectively. A map more or less similar to the map shown in FIG. 7 is required for each valve timing. In the present embodiment, the valve timing is used as a value corresponding to an amount of exhaust gas flowing backwards, and does not simply refer to a valve-open period when both the intake and exhaust valves are open, namely, a valve overlap amount. Even for an equal valve overlap amount, if the intake valve is lifted by a large amount during the period, the amount of exhaust gas flowing backwards increases. Even for an equal valve overlap amount, the amount of exhaust gas flowing backwards changes depending on a valve overlap period. Thus, all these factors are considered in defining the concept of valve timing.

In the case where the valve timing is thus made variable, it is preferable that the first coefficient "e", the second coefficient "g", and the third coefficient "r" in the aforementioned equation (5) be set according to a three-dimensional map including valve timings as well as engine speeds and opening degrees of the control valve. It is preferable that the fourth coefficient "a", the fifth coefficient "b", and the sixth coefficient "c" in the aforementioned equation (6) be set according to a two-dimensional map including valve timings as well as engine speeds. For the sake of simplicity, however, it is also appropriate that the second coefficient "g" and the fifth coefficient "b" be set according to a one-dimensional map of engine speeds. Alternatively, it is also appropriate that the second coefficient "g" and the fifth coefficient "b" be equalized with each other and be set in a one-dimensional map of engine speeds. Except in the case where the valve timing assumes such a value that exhaust gas is prevented from flowing backwards, if the pressure Pm in the intake pipe and the amount KL of intake air are set as indicated by the solid line L21 in FIG. 7 as in the case of the present embodiment, the fourth coefficient "a" is changed to a different value when the pressure Pm in the intake pipe becomes equal to the fifth coefficient "b". The relational expressions shown in FIG. 7 are also set by a relational expression setter (not shown) constituting the intake air amount estimation apparatus of the invention.

Then, the intake pipe is modeled. A temporal change rate of a ratio of a pressure Pm in the intake pipe to a temperature Tm of gas in the intake pipe is expressed by an equation (7) shown below, using the law of conservation of mass, the law of conservation of energy, and a state equation of intake air and exhaust gas that exist in the intake pipe. A temporal change rate of the pressure Pm in the intake pipe is expressed by an equation (8) shown below. It is to be noted herein that V represents a volume (m³) of the aforementioned intake pipe and that mc represents an amount (g/sec) of intake gas flowing into the cylinders.

$$\frac{d}{dt}\left(\frac{Pm}{Tm}\right) = \frac{R}{V}(mt + megr - mc) \quad (7)$$

$$\frac{dPm}{dt} = \kappa \cdot \frac{R}{V} \cdot (mt \cdot Ta + megr \cdot Te - mc \cdot Tm) \quad (8)$$

The equations (7) and (8) are discretized, whereby equations (9) and (10) shown below are obtained respectively. If a current pressure $Pm_{(i)}$ in the intake pipe is obtained from the equation (10), a current temperature $Tm_{(i)}$ of intake air in the intake pipe can be obtained from the equation (9). In the equations (9) and (10), a flowchart (FIG. 8) for calculating a current amount $mc_{(i)}$ of intake gas is executed at intervals of a discrete time Δt. For example, the discrete time Δt is 8 ms.

$$\frac{Pm_{(i)}}{Tm_{(i)}} = \frac{Pm_{(i-1)}}{Tm_{(i-1)}} + \Delta t \cdot \frac{R}{V} \cdot (mt_{(i-1)} + megr_{(i-1)} - mc_{(i-1)}) \quad (9)$$

$$Pm_{(i)} = Pm_{(i-1)} + \Delta t \cdot \kappa \cdot \frac{R}{V} \cdot (mt_{(i-1)} \cdot Ta + \quad (10)$$
$$megr_{(i-1)} \cdot Te_{(i-1)} - mc_{(i-1)} \cdot Tm_{(i-1)})$$

Next, a flowchart shown in FIG. 8 will be described. A routine of this flowchart is executed as soon as the engine has been started. First of all in a step 101, a pressure $Pm_{(i)}$ in the intake pipe is calculated using the equation (10). The equation (10) is designed to calculate a current pressure $Pm_{(i)}$ in the intake pipe on the basis of a last pressure $Pm_{(i-1)}$ in the intake pipe, a last amount $mt_{(i-1)}$ of air flowing past the throttle valve, a last amount $megr_{(i-1)}$ of exhaust gas flowing past the control valve, a last amount $mc_{(i-1)}$ of intake gas, a last temperature $Tm_{(i-1)}$ in the intake pipe, and a last temperature $Te_{(i-1)}$ of exhaust gas.

As initial values of $Pm_{(i-1)}$, $Tm_{(i-1)}$, and $Te_{(i-1)}$, an atmospheric pressure Pa, a temperature Ta of intake air upstream of the throttle valve, a temperature of exhaust gas are respectively used after having been actually measured or estimated. Using these values, values calculated substantially in the same manner as in subsequent steps 103, 104, and 105 are adopted as $mt_{(i-1)}$, $megr_{(i-1)}$, and $mc_{(i-1)}$ respectively. In the case where there is no exhaust gas temperature sensor provided, when the present routine is executed for the second time and henceforth, a temperature Te of exhaust gas can be estimated on the basis of a last amount mair of intake air, a last amount of fuel injection, or the like.

Then in a step 102, a current temperature $Tm_{(i)}$ of intake air in the intake pipe is calculated on the basis of the current intake pipe pressure $Pm_{(i)}$ calculated in the step 101, using the equation (9). Then in the step 103, a current amount $mt_{(i)}$ of air flowing past the throttle valve is calculated using the equation (1). In the case where the throttle valve is driven by a drive unit (e.g., a stepper motor), a response delay of the drive unit is taken into account as to a current opening degree TA of the throttle valve when the amount $mt_{(i)}$ of air flowing past the throttle valve is calculated using the equation (1).

Then in the step 104, using an equation (11) shown below, a current amount $megr_{(i)}$ of exhaust gas flowing past the control valve is calculated on the basis of the current pressure $Pm_{(i)}$ in the intake pipe, as a difference between the equations (6) and (5).

$$megr_{(i)} = a(Pm_{(i)} - b) + c - (e(Pm_{(i)} - g) + r) \quad (11)$$

As described above, values set on the basis of valve timings corresponding to a current engine speed, a current opening of the control valve, and a current operation state of the engine are used as the first coefficient "e", the second coefficient "g", and the third coefficient "r", whereas values set on the basis of valve timings corresponding to a current engine speed and a current operation state are used as the fourth coefficient "a", the fifth coefficient "b", and the sixth coefficient "c". The first coefficient "e", the second coefficient "g", the third coefficient "r", the fourth coefficient "a", the fifth coefficient "b", and the sixth coefficient "c" are set for a standard atmospheric state, and are corrected in accordance with a current state in the intake pipe and on the basis of the intake pipe temperature Tm calculated in the step 102, an atmospheric temperature Ta, or the like. A current opening degree of the control valve is a current and actual opening degree of the control valve which takes response delays of the control valve and an actuator thereof into account. It is appropriate that the first coefficient "e", the second coefficient "g", and the third coefficient "r" be finely set in the form of a map for the current opening degree of the control valve. However, with a view to reducing a storage amount of data, in the case where these coefficients are set simply for each target opening degree of the control valve corresponding to each operation state of the engine, it is also appropriate that a value set for two target opening degrees of the control valve be complemented with respect to the current opening degree of the control valve and then be used.

Then in the step 105, a current amount $mc_{(i)}$ of intake gas is calculated on the basis of the current pressure $Pm_{(i)}$ in the intake pipe. The amount $mc_{(i)}$ of intake gas is calculated by means of the equation (6) and coincides with an intake air amount KL in the case where the interior of the intake pipe is filled with fresh air with the control valve being closed completely.

The amount $mc_{(i)}$ of intake gas is the sum of an amount of intake exhaust gas and an amount of intake air. If a current amount $megrsm_{(i)}$ of intake exhaust gas is known, a current intake air amount $mair_{(i)}$ can be calculated ($mair_{(i)} = mc_{(i)} - megrsm_{(i)}$). If the engine is in steady operation, the current amount $megr_{(i)}$ of exhaust gas flowing past the control valve as the amount calculated in the step 104 coincides with the current amount $megrsm_{(i)}$ of intake exhaust gas. However, if the engine is in transition, exhaust gas flowing past the control valve is drawn into the cylinders while being diffused, so that a first-order lag is caused. A dead time resulting from a delay in transportation from the control valve into the cylinders is caused as well. Thus, the current amount of exhaust gas flowing past the control valve is drawn into the cylinders with a delay.

If it is assumed that $\tau$ represents a time constant for a first-order lag and that Td represents a dead time, an intake exhaust gas amount calculated by smoothening the amount $megr_{(i)}$ of exhaust gas flowing past the control valve at the present moment by means of the time constant $\tau$ is equal to an intake exhaust gas amount $megrsm_{(i+Td/\Delta t)}$ after the lapse of the dead time Td from the present moment.

$$megrsm_{(i+Td/\Delta t)} = \Delta t/\tau(megr_{(i)} - megrsm_{(i+Td/\Delta t - 1)}) \quad (12)$$

If an amount megrsm of intake exhaust gas is calculated by means of an equation (12) and then stored, a current amount $megrsm_{(i)}$ of intake exhaust gas can be retrieved in a step 106. The amount $megrsm_{(i)}$ of intake exhaust gas is calculated by a calculator (not shown) constituting the intake air amount estimation apparatus of the invention.

Then in a step 107, a current amount $mair_{(i)}$ of intake air is calculated by subtracting the current amount $megrsm_{(i)}$ of intake exhaust gas from the current amount $mc_{(i)}$ of intake gas. The intake air amount $mair_{(i)}$ is calculated by a calculator (not shown) constituting the intake air amount estimation apparatus of the invention. The aforementioned values, namely, the pressure $Pm_{(i)}$ in the intake pipe, the temperature $Tm_{(i)}$ of intake air, the amount $mt_{(i)}$ of air flowing past the throttle valve, the amount $megr_{(i)}$ of exhaust gas flowing past the control valve, and the amount $mc_{(i)}$ of intake gas may also be calculated by means of the calculator.

Then in a step 108, the current pressure $Pm_{(i)}$ in the intake pipe is set as a last pressure $Pm_{(i-1)}$ in the intake pipe. In a step 109, the current temperature $Tm_{(i)}$ of gas in the intake pipe is set as a last temperature $Tm_{(i-1)}$ of gas in the intake pipe. Furthermore in a step 110, the current amount $mt_{(i)}$ of air flowing past the throttle valve is set as a last amount $mt_{(i-1)}$ of air flowing past the throttle valve. In a step 111, the current amount $megr_{(i)}$ of exhaust gas flowing past the control valve is set as a last amount $megr_{(i-1)}$ of exhaust gas flowing past the control valve. In a step 112, the current amount $mc_{(i)}$ of intake gas is set as a last amount $mc_{(i-1)}$ of intake gas.

Thus, an intake air amount mair is successively estimated on the basis of an intake pipe pressure Pm that is successively calculated as soon as the engine has been started, in consideration of an opening degree of the control valve and a valve timing.

If the engine is in steady operation, an amount $mt_{(i)}$ of air flowing past the throttle valve can be calculated according to an equation (13) shown below, using a pressure Pmta in the intake pipe during steady operation of the engine.

$$mt_{(i)} = (e(Pmta - g) + r) \cdot \frac{\Phi(Pm_{(i)}/Pa)}{\Phi(Pmta/Pa)} \quad (13)$$

In the step 103 of the flowchart, an amount $mt_{(i)}$ of air flowing past the throttle valve may also be calculated using the equation (13) instead of the equation (1). The pressure Pmta in the intake pipe during steady operation of the engine can be set in advance in the form of a map on the basis of an opening degree of the throttle valve, an engine speed, an opening degree of the control valve, and a valve timing at the end of the present transition.

Thus, an intake gas amount is calculated using the equation (6) that depends on a combination of an engine speed and a valve timing, and an intake air amount is calculated using the equation (5) that depends on a combination of an engine speed, a valve timing, and an opening degree of the control valve. A difference between the intake gas amount and the intake air amount thus calculated is equal to an amount of exhaust gas flowing past the control valve. An amount of intake exhaust gas is calculated on the basis of the amount of exhaust gas flowing past the control valve. Then, an intake air amount can be calculated by subtracting the amount of intake exhaust gas from the amount of intake gas.

Although the equations (6) and (5) represent an intake gas amount and an intake air amount that are suited for an internal combustion engine having a specific displacement, they may represent an intake gas amount and an intake air amount that are suited for an internal combustion engine having an arbitrary displacement. More specifically, the equation (6) may represent as an intake gas amount a load factor (intake air amount/(volume of one cylinder×air density in standard state)) or an intake air filling efficiency at the time when the control valve is closed, and the equation (5) may represent as an intake air amount a load factor or an intake air filling efficiency.

Because a three-dimensional map is required as to the equation (5), a large amount of data must be stored. As is apparent from the equation (3), an amount megr of exhaust gas flowing past the control valve 14 mainly depends on a pressure Pm in the intake pipe and an exhaust gas pressure Pe immediately downstream of the control valve 14. On the other hand, for an equal pressure in the intake pipe and an equal speed of the engine, a change in intake air amount with respect to a valve timing is considered to be small. If there is no change in intake air amount, neither the pressure Pm in the intake pipe nor the pressure Pe of exhaust gas changes. From an approximate point of view, therefore, the amount megr of exhaust gas flowing through the control valve is hardly changed by the presence or absence of a valve overlap period or changes in valve timing and can be regarded as constant.

Referring to FIGS. 6 and 7, the amount of exhaust gas flowing past the control valve for each pressure Pm in the intake pipe in the case where the valve overlap amount is 0 (i.e., a difference between L11 and L12, a difference between L11 and L13, or a difference between L12 and L13) may be considered to be substantially equal to the amount of exhaust gas flowing past the control valve for each pressure Pm in the intake pipe in the case where the valve timing is equal to VVT1 (i.e., a difference between L21 and L22, a difference between L21 and L23, or a difference between L22 and L23).

That is, a difference between intake air amounts (or a difference between an intake gas amount and an intake air amount) for two arbitrary opening degrees of the control valve with an arbitrary pressure Pm in the intake pipe can be regarded as constant irrespective of a valve timing. For instance, if an intake air amount KL for an intake pipe pressure Pm is set for each opening degree of the control valve only in the case where the valve overlap amount is 0, it is appropriate for other valve timings that an intake air amount KL for an intake pipe pressure Pm be set only for a specific opening degree of the control valve.

Figure 9:
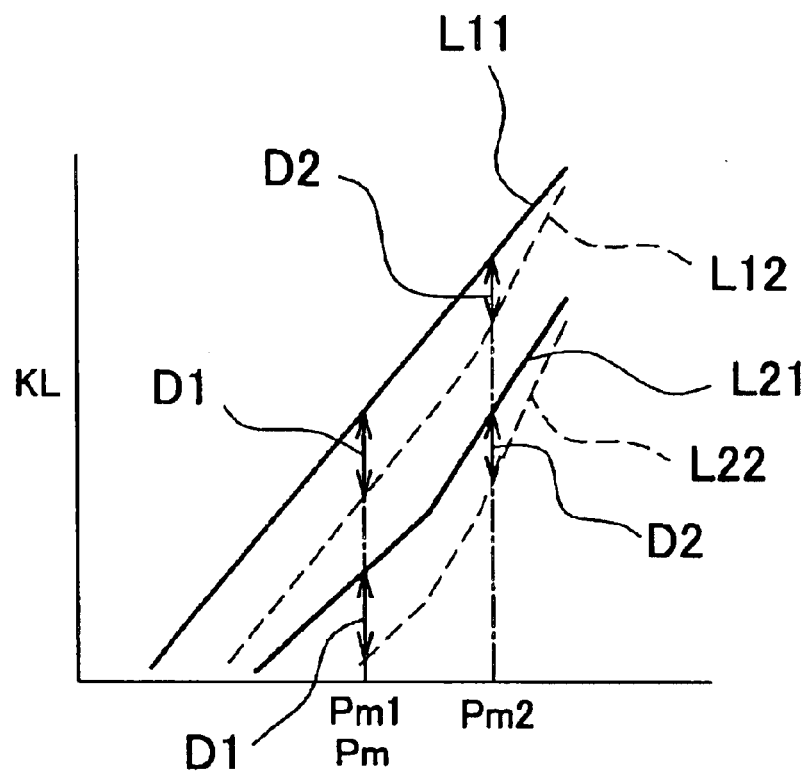
FIG. 9 shows a relationship between pressures Pm of the intake pipe and intake air amounts KL in the case where the opening degree of the control valve is 0.

A more concrete description will now be given with reference to FIG. 9. As indicated by a solid line, a relational expression of an intake gas amount mc for an intake pipe pressure Pm at the time when the opening degree of the control valve is 0 is set for each valve timing. As for the case where the valve overlap amount is 0, a relational expression of an intake air amount KL for an intake pipe pressure Pm for each opening degree of the control valve is set. These relational expressions are set by a relational expression setter (not shown) constituting the intake air amount estimation apparatus of the invention. Relational expressions indicated by broken lines are also set by the relational expression setter. In the case where the valve overlap amount is 0, an intake gas amount for an arbitrary pressure in the intake pipe is calculated for each opening degree of the control valve, using a corresponding one of the relational expressions. In calculating an intake air amount KL for an arbitrary intake pipe pressure at an arbitrary opening degree of the control valve for other arbitrary valve timings, a difference between an intake gas amount and an intake air amount, namely, an amount of exhaust gas flowing past the control valve (i.e., an amount of intake exhaust gas) for an arbitrary intake pipe pressure in the case where the valve overlap amount is 0 with the opening degree of the control valve being 0 and an arbitrary value, is calculated. Then, for arbitrary valve timing, the amount of exhaust gas flowing past the control valve is subtracted from an intake gas amount for an arbitrary intake pipe pressure at the time when the opening degree of the control valve is 0.

Namely, in the case where the valve timing is equal to VVT1, an intake air amount KL for an intake pipe pressure Pm1 at the time when the opening degree of the control valve is EA1 is calculated as follows. First of all, a difference D1 in intake air amount (an amount of intake exhaust gas) for an intake pipe pressure Pm1 in the case where the valve overlap amount is 0 with the opening degree of the control valve being 0 (L11) and EA1 (L12) is calculated. In the case where the valve timing is equal to VVT1, the difference D1 in intake air amount is subtracted from an intake air amount for the intake pipe pressure Pm1 at the time when the opening degree of the control valve is 0 (L21). An intake air amount KL for an intake pipe pressure Pm2 in the case where the valve timing is equal to VVT1 with the opening degree of the control valve being EA1 is calculated as follows. First of all, a difference D2 in intake air amount (an amount of intake exhaust gas) D2 for an intake pipe pressure Pm2 in the case where the valve overlap amount is 0 with the opening degree of the control valve being 0 (L11) and EA1 (L12) is calculated. In the case where the valve timing is equal to VVT1, the difference D2 in intake air amount is subtracted from an intake air amount for the intake pipe pressure Pm2 at the time when the opening degree of the control valve is 0 (L21). Thus, a relationship between the pressure in the intake pipe and the amount KL of intake air for the opening degree EA1 of the control valve in the case where the valve timing is equal to VVT1 is substantially set as indicated by a dotted line L22. The aforementioned differences D1 and D2 in intake air amount (the amounts of intake exhaust gas) and the intake air amount KL are calculated by a calculator (not shown) constituting the intake air amount estimation apparatus of the invention.

In the case where the relational expression between the pressure in the intake pipe and the amount of intake air is thus set, an amount megr of exhaust gas flowing past the control valve is calculated according to an equation (14) shown below in the step 104 of the flowchart shown in FIG. 8.

$$megr = a21(Pm-b21)+c21-(a11(Pm-b11)+c11-(e12(Pm-g12)+r12)) \quad (14)$$

A third coefficient a21, a fourth coefficient b21, and a fifth coefficient c21 are determined in accordance with a current engine speed and a current valve timing for an opening degree 0 of the control valve. A third coefficient a11, a fourth coefficient b11, and a fifth coefficient c11 are determined in accordance with a current engine speed for an opening degree 0 of the control valve and a valve timing corresponding to a valve overlap amount 0. A first coefficient e12, a second coefficient g12, and a third coefficient r12 are determined in accordance with a current engine speed for a current opening degree of the control valve and a valve timing corresponding to a valve overlap amount 0. A difference for each intake pipe pressure between an intake air amount at the time when the valve overlap amount is 0 with the opening degree of the control valve being 0 and an intake air amount at the time when the valve overlap amount is 0 with the opening degree of the control valve being an arbitrary value (e.g., a11(Pm−b11)+c11−(e12(Pm−g12)+r12)) may be prepared in advance in the form of a map on the basis of opening degrees of the control valve and pressures in the intake pipe.

In the conception described hitherto, the valve timing as a reference may be a specific valve timing instead of a valve timing corresponding to a valve overlap amount 0. Also, the opening degree of the control valve as a reference may be a specific opening degree of the control valve instead of 0. Thus, in the aforementioned equation (5), it is appropriate that the first coefficient "e", the second coefficient "g", and the third coefficient "r" be set according to a two-dimensional map of engine speeds and opening degrees of the control valve for a specific valve timing (e.g., corresponding to a valve overlap amount 0). Thus, in comparison with a case where those coefficients are set according to a three-dimensional map, the amount of data to be stored can be reduced significantly. In the aforementioned equation (6), the fourth coefficient "a", the fifth coefficient "b", and the sixth coefficient "c" are set according to a two-dimensional map of engine speeds and valve timings for a specific opening degree of the control valve (e.g., an opening degree 0). As described above, the second coefficient "g" and the fifth coefficient "b" may be set according to a one-dimensional map of engine speeds.

In this manner, estimation of a current intake air amount mair$_{(i)}$ is made possible. In order to precisely control a combustion air-fuel ratio, it is necessary to estimate an amount of intake air flowing into the cylinders and to determine a fuel injection amount before fuel injection is started. In a strict sense, however, estimation of an intake air amount requires calculation of an amount of intake air at the time when the intake valve is closed. That is, when a fuel injection amount is determined, an intake air amount mair$_{(i+n)}$ at the time when the intake valve is closed must be calculated instead of a current intake air amount mair$_{(i)}$. This holds true not only for the internal combustion engine designed to inject fuel into the intake branch pipes 3 as shown in FIG. 1 but also for an internal combustion engine designed to directly inject fuel into cylinders during a suction stroke.

Also, in order to precisely control a combustion air-fuel ratio, purpose, at the present moment, it is necessary to change μ×A in the equation (1) or PmTA in the equation (4) on the basis of not only a current opening degree TA$_{(i)}$ of the throttle valve but also opening degrees TA$_{(i+1)}$, TA$_{(i+2)}$, . . . and TA$_{(i+n)}$ of the throttle valve for each time Δt left before the closure of the intake valve, and to calculate an amount mt of air flowing past the throttle valve at each moment.

It is contemplable to estimate a depression stroke of the accelerator pedal at each moment on the basis of a change in depression stroke of the accelerator pedal for the present moment and on the assumption that this change in depression stroke lasts until the intake valve is closed, and to determine an opening degree TA of the throttle valve at each moment in consideration of a response delay of an actuator of the throttle valve with respect to the estimated depression stroke at each moment. This method is also applicable in the case where the throttle valve is mechanically coupled to the accelerator pedal.

However, the thus-estimated opening degree TA$_{(i+n)}$ of the throttle valve at the time when the intake valve is closed is merely a predicted value and is not guaranteed to coincide with an actual value. In order to equalize the opening degree TA$_{(i+n)}$ of the throttle valve at the time when the intake valve is closed with the actual value, a retardation control of the throttle valve may be performed. If the depression stroke of the accelerator pedal changes, the opening degree of the throttle valve changes with a certain delay because of a response delay of the actuator. This retardation control is designed to deliberately increase a response delay of the throttle valve.

For instance, in order to ensure that an opening degree of the throttle valve corresponding to a current depression stroke of the accelerator pedal at the time when a fuel injection amount is determined is realized when the intake valve is closed during transition of the engine, the actuator of the throttle valve is controlled in consideration of an actual response delay (i.e., a dead time). Thus, an opening degree TA$_{(i)}$, TA$_{(i+1)}$, . . . or TA$_{(i+n)}$ for each moment from the present moment to the moment when the intake valve is closed can be grasped precisely. To be more specific, if the depression stroke of the accelerator pedal changes, an activation signal is issued to the actuator not immediately but only after the lapse of a period obtained by subtracting the dead time from a period ranging from the moment when a fuel injection amount is determined to the moment when the intake valve is closed. As a matter of course, the retardation control of the throttle valve may be performed such that an opening degree of the throttle valve corresponding to a current depression stroke of the accelerator pedal is realized after the intake valve has been closed.

Figure 10:
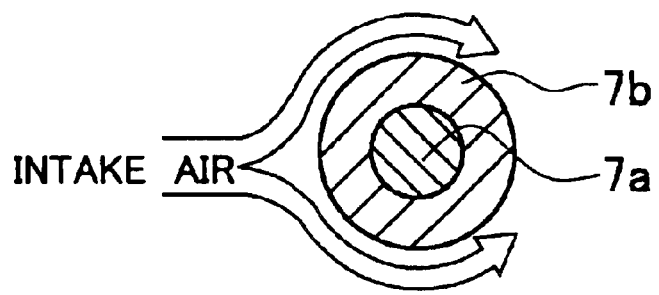
FIG. 10 shows a cross-sectional model of an air flow meter.

The air flow meter 7 is disposed in the intake passage 4. FIG. 10 shows a cross-sectional model of the air flow meter 7. By making use of the fact that an amount of heat absorbed from a hot wire 7a during passage of intake air through an area surrounding the hot wire 7a changes in accordance with an amount of the intake air, namely, an amount of air flowing past the throttle valve, the air flow meter 7 detects the amount of air flowing past the throttle valve. Thus, an amount GA$_{(i)}$ (which is denoted by a different symbol so as to be distinguished from a calculated amount mt$_{(i)}$ of air flowing past the throttle valve) of air flowing past the throttle valve can be obtained on the basis of an output of the air flow meter 7, using a map or the like.

In a generally employed air flow meter, a glass layer 7b is provided around the hot wire 7a. The glass layer 7b has a relatively high thermal capacity. Hence, if a change in the actual amount of air flowing past the throttle valve is caused, the output of the air flow meter 7 changes not immediately but with a certain response delay. A consideration will now be given to the idea of calculating an actual amount mt$_{(i)}$ of air flowing past the throttle valve from an output of the air flow meter while allowing for the response delay.

The amount of heat transferred from the hot wire 7a to the glass layer 7b is equal to the amount of heat transferred from the glass layer 7b to intake air. Therefore, if it is assumed that Th represents a current temperature of the hot wire 7a, an amount dTg/dt of change in temperature of the glass layer 7b can be expressed as indicated by an equation (15) shown below.

$$c \cdot \frac{d}{dt} Tg = D \cdot (Th - Tg) - \left(E + F\sqrt{mt}\right) \cdot (Th - Ta) \quad (15)$$

It is to be noted herein that C, D, E and F are constants that are determined in accordance with a cross-sectional area of the hot wire 7a, a length of the hot wire 7a, a specific resistance of the hot wire 7a, a heat transfer rate between the glass layer 7b and the hot wire 7a, a heat transfer rate between the glass layer 7b and intake air, and the like. In the equation (15), since no heat is transferred between the glass layer 7b and the hot wire 7a or intake air during steady operation, the amount dTg/dt of change in temperature of the glass layer 7b, namely, the right side of the equation (15) is equal to 0. At this moment, the map value GA of the amount of air flowing past the throttle valve is equal to the calculated value mt. On this condition, the map value GA is expressed by a temperature Th of the hot wire 7a, a temperature Tg of the glass layer 7b, and a temperature Ta of intake air. The temperature Tg of the glass layer 7b is erased in the equation (15). Thus, an equation (16) shown below can be obtained.

$$mt_{(i)} = \left\{ \sqrt{GA_{(i)}} + \frac{\alpha}{\Delta t} \cdot \frac{\sqrt{GA_{(i)}} - \sqrt{GA_{(i-1)}}}{\beta + \sqrt{GA_{(i)}}} \right\}^2 \quad (16)$$

In the equation (16), it is to be noted that α and β are constants determined by the aforementioned constants C, D, E and F. In consideration of a response delay of the air flow meter, an amount $mt_{(i)}$ of air flowing past the throttle valve can be calculated on the basis of a map value $GA_{(i)}$ of an amount of air flowing past the throttle valve and a map value $GA_{(i-1)}$ of an amount of air flowing past the throttle valve. The map value $GA_{(i)}$ is based on a current output of the air flow meter 7, whereas the map value $GA_{(i-1)}$ is based on a last output of the air flow meter 7.

An output of the air flow meter 7 is highly reliable when the engine is in steady operation. Hence, when the engine is in steady operation, a current amount $mt_{(i)}$ of air flowing past the throttle valve as an amount calculated according to the equation (16) is more reliable than an amount of air flowing past the throttle valve as an amount calculated according to the equation (1) or the equation (13). Accordingly, when the engine is in steady operation, it is preferable that a current pressure $Pm_{(i)}$ in the intake pipe be calculated according to the equation (10) using a last amount $mt_{(i-1)}$ of air flowing past the throttle valve as an amount calculated according to the equation (16), and that a current amount $mair_{(i)}$ of intake air be calculated after calculating a current temperature $Tm_{(i)}$ of intake air downstream of the throttle valve according to the equation (9).

Figure 8:
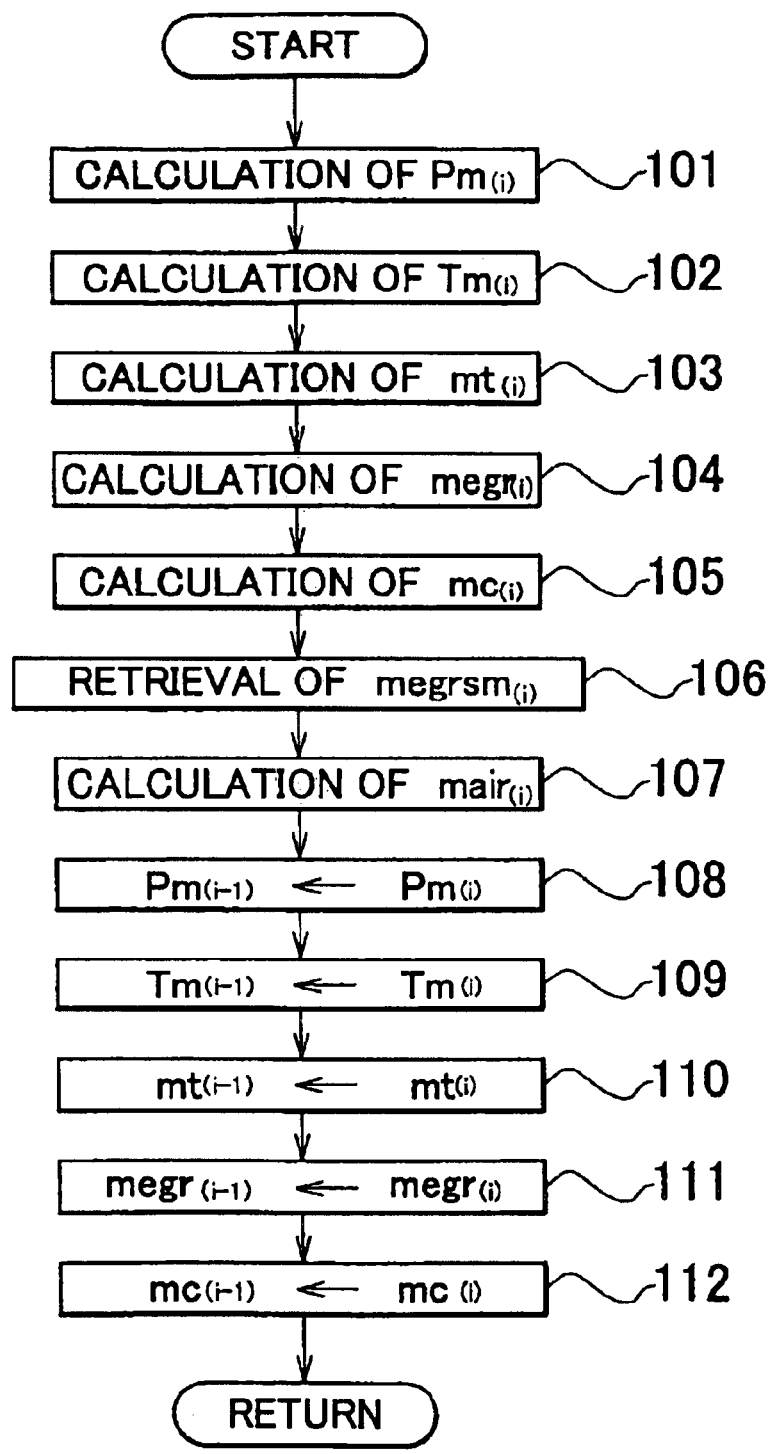
FIG. 8 is a flowchart for calculating an intake air amount.

Thus, it is also appropriate to calculate a current amount $mair_{(i)}$ of intake air and an amount $mair_{(i+n)}$ of intake air at the time when the intake valve is closed by means of the flowchart shown in FIG. 8, to sequentially calculate a current amount $mairf_{(i)}$ of intake air according to the equation (16) as described above, and to calculate an amount of intake air at the time when the intake valve is closed as $mair_{(i+n)} = mair_{(i)} + mairf_{(i)}$. Because of the method of calculation as described above, when the engine is in steady operation, the amounts $mair_{(i+n)}$ and $mair_{(i)}$ that are calculated for the same opening degree of the throttle valve on the basis of the same model equation are reliably counterbalanced. Thus, a current intake air amount as a precise value calculated on the basis of an output of the air flow meter is obtained as an intake air amount at the time when the intake valve is closed.

During transition of the engine, since the amounts $mair_{(i)}$ and $mairf_{(i)}$ are substantially counterbalanced, an intake air amount at the time when the intake valve is closed, namely, a value calculated as $mair_{(i+n)}$ can be obtained. Although the embodiment employing the air flow meter has been described hitherto, it is also appropriate that a pressure sensor be disposed in the intake pipe and that an intake pipe pressure Pm used for calculation of an intake air amount be adopted not as a calculated value but as an output value of the pressure sensor. As described above, it is also appropriate to make and store a map of amounts of exhaust gas flowing past the control valve in relation to intake pipe pressures for each opening degree of the control valve, instead of making a map of a relational expression between intake pipe pressures and intake air amounts in relation to engine speeds (and valve timings) for each opening degree of the control valve.

While the invention has been described with reference to the exemplary embodiment thereof, it is to be understood that the invention is not limited to the exemplary embodiment or construction. To the contrary, the invention is intended to cover various modifications and equivalent arrangements. In addition, while the various elements of the exemplary embodiment are shown in various combinations and configurations, which are exemplary, other combinations and configurations, including more, less or only a single element, are also within the spirit and scope of the invention.

What is claimed is:

1. An intake air amount estimation apparatus for an internal combustion engine, comprising:
    a first relational expression setter that sets a first relational expression between an intake pipe pressure and an amount of intake gas flowing into cylinders in the case of a first valve timing of the internal combustion engine wherein a valve timing can be changed in at least two stages between the first valve timing and a second valve timing and wherein an exhaust gas recirculation passage provided with a control valve is connected to an intake pipe downstream of a throttle valve;
    a second relational expression setter that sets a second relational expression between the intake pipe pressure and the intake gas amount in the case of the second valve timing;
    a first calculator that calculates, in the case of the first valve timing, an amount of recirculated exhaust gas flowing past the control valve which is based on an intake pipe pressure at the time when the control valve is at a specific opening degree, as an amount of intake exhaust gas flowing into the cylinders during steady operation of the engine;
    a second calculator that calculates, on the basis of the intake exhaust gas amount and by means of the first relational expression, an amount of intake air that is drawn via the throttle valve at the time when the control valve is at the specific opening degree in the case of the first valve timing; and
    a third calculator that calculates, on the basis of the intake exhaust gas amount and by means of the second relational expression, an intake air amount at the time when the control valve is at the specific opening degree in the case of the second valve timing, on the assumption that the intake exhaust gas amount for the specific opening degree based on the intake pipe pressure remains unchanged irrespective of a valve timing.

2. The intake air amount estimation apparatus according to claim 1, wherein
    in consideration of the fact that the recirculated exhaust gas flowing past the control valve is drawn into the cylinders with a delay when the internal combustion engine is in transition, the amount of recirculated exhaust gas is corrected to the intake exhaust gas amount by the first calculator and is used to calculate the intake air amount.

3. The intake air amount estimation apparatus according to claim 1, wherein
the intake gas amount is a sum of the intake exhaust gas amount and an amount of air flowing past the throttle valve.

4. The intake air amount estimation apparatus according to claim 1, wherein
the intake gas amount is equal to an intake air amount calculated by the second calculator and to an intake air amount calculated by the third calculator if the control valve is completely closed.

5. An intake air amount estimation method for an internal combustion engine, comprising the steps of:
setting a first relational expression between an intake pipe pressure and an amount of intake gas flowing into cylinders in the case of a first valve timing of the internal combustion engine wherein a valve timing can be changed in at least two stages between the first valve timing and a second valve timing and wherein an exhaust gas recirculation passage provided with a control valve is connected to an intake pipe downstream of a throttle valve;
setting a second relational expression between the intake pipe pressure and the intake gas amount in the case of the second valve timing;
calculating, in the case of the first valve timing, an amount of recirculated exhaust gas flowing past the control valve which is based on an intake pipe pressure at the time when the control valve is at a specific opening degree, as an amount of intake exhaust gas flowing into the cylinders during steady operation of the engine;
calculating, on the basis of the intake exhaust gas amount and by means of the first relational expression, an amount of intake air that is drawn via the throttle valve at the time when the control valve is at the specific opening degree in the case of the first valve timing; and
calculating, on the basis of the intake exhaust gas amount and by means of the second relational expression, an intake air amount at the time when the control valve is at the specific opening degree in the case of the second valve timing, on the assumption that the intake exhaust gas amount for the specific opening degree based on the intake pipe pressure remains unchanged irrespective of a valve timing.

6. The intake air amount estimation method according to claim 5, wherein
in consideration of the fact that the recirculated exhaust gas flowing past the control valve is drawn into the cylinders with a delay when the internal combustion engine is in transition, the amount of recirculated exhaust gas is corrected to the intake exhaust gas amount and is used to calculate the intake air amount.

7. The intake air amount estimation method according to claim 5, wherein
the intake gas amount is a sum of the intake exhaust gas amount and an amount of air flowing past the throttle valve.

8. The intake air amount estimation method according to claim 5, wherein
the intake gas amount is equal to a calculated amount of intake air if the control valve is completely closed.

9. An intake air amount estimation apparatus for an internal combustion engine, comprising:

a relational expression setter that sets, on the assumption that an amount of recirculated exhaust gas flowing past a control valve which is based on an intake pipe pressure is equal to an amount of intake exhaust gas flowing into cylinders during steady operation of the internal combustion engine wherein a valve timing is variable and wherein an exhaust gas recirculation passage provided with the control valve is connected to an intake pipe downstream of a throttle valve, a relational expression between an intake pipe pressure $Pm$ and an amount $KL$ of intake air drawn via the throttle valve during steady operation of the engine as $KL=e(Pm-g)+r$, using coefficients "e" and "r" that are determined in advance in accordance with an engine speed, the valve timing, and an opening degree of the control valve and a coefficient "g" that is determined in advance in accordance with the engine speed alone or its combination with the valve timing and/or the opening degree of the control valve;
a first calculator that calculates, as an amount of intake exhaust gas flowing into the cylinders during steady operation of the engine, an amount of recirculated exhaust gas flowing past the control valve which is based on an intake pipe pressure at the time when the control valve is at a specific opening degree; and
a second calculator that calculates, on the basis of the intake exhaust gas amount and by means of the relational expression, the intake air amount at the time when the control valve is at the specific opening degree.

10. The intake air amount estimation apparatus according to claim 9, wherein
in consideration of the fact that an amount of recirculated exhaust gas flowing past the control valve is drawn into the cylinders with a delay when the internal combustion engine is in transition, the amount of recirculated exhaust gas flowing past the control valve as an amount calculated by means of the relational expression is corrected to the intake exhaust gas amount by the first calculator and is used to calculate the intake air amount.

11. The intake air amount estimation apparatus according to claim 9, wherein
the intake gas amount is a sum of the intake exhaust gas amount and an amount of air flowing past the throttle valve.

12. The intake air amount estimation apparatus according to claim 9, wherein
the intake gas amount is equal to an intake air amount calculated by the second calculator if the control valve is completely closed.

13. An intake air amount estimation method for an internal combustion engine, comprising the steps of:
setting, on the assumption that an amount of recirculated exhaust gas flowing past a control valve as an amount based on an intake pipe pressure is equal to an amount of intake exhaust gas flowing into cylinders during steady operation of the internal combustion engine wherein a valve timing is variable and wherein an exhaust gas recirculation passage provided with the control valve is connected to an intake pipe downstream of a throttle valve, a relational expression between an intake pipe pressure $Pm$ and an amount $KL$ of intake air drawn via the throttle valve during steady operation of the engine as $KL=e(Pm-g)+r$, using coefficients "e" and "r" that are determined in advance in accordance with an engine speed, the valve timing, and an opening degree of the control valve and a coefficient "g" that is determined in advance in accordance with the engine speed alone or its combination with the valve timing and/or the opening degree of the control valve;

calculating, as an amount of intake exhaust gas flowing into the cylinders during steady operation of the engine, an amount of recirculated exhaust gas flowing past the control valve which is based on an intake pipe pressure at the time when the control valve is at a specific opening degree; and calculating, on the basis of the intake exhaust gas amount and by means of the relational expression, the intake air amount at the time when the control valve is at the specific opening degree.

14. The intake air amount estimation method according to claim 13, wherein in consideration of the fact that an amount of recirculated exhaust gas flowing past the control valve is drawn into the cylinders with a delay when the internal combustion engine is in transition, the amount of recirculated exhaust gas flowing past the control valve as an amount calculated by means of the relational expression is corrected to the intake exhaust gas amount and is used to calculate the intake air amount.

15. The intake air amount estimation method according to claim 13, wherein the intake gas amount is a sum of the intake exhaust gas amount and an amount of air flowing past the throttle valve.

16. The intake air amount estimation method according to claim 13, wherein the intake gas amount is equal to an intake air amount calculated if the control valve is completely closed.

* * * * *